Figure 1:
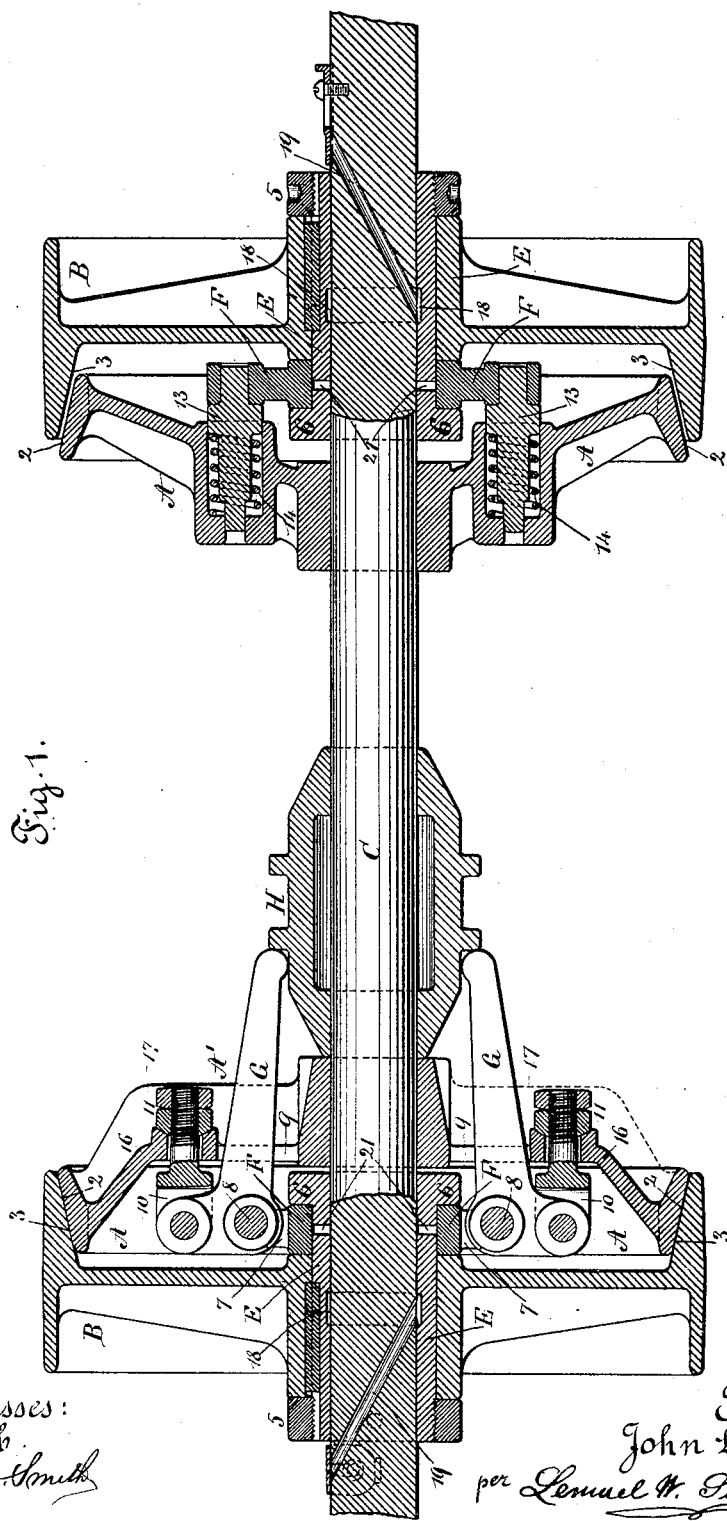

(No Model.)  2 Sheets—Sheet 1.

J. L. BOGERT.
FRICTION CLUTCH.

No. 370,118.  Patented Sept. 20, 1887.

Witnesses:
J. Staib.
Chas. H. Smith

Inventor:
John L. Bogert
per Lemuel W. Serrell  atty (No Model.) 2 Sheets—Sheet 2.
J. L. BOGERT.
FRICTION CLUTCH.
No. 370,118. Patented Sept. 20, 1887.
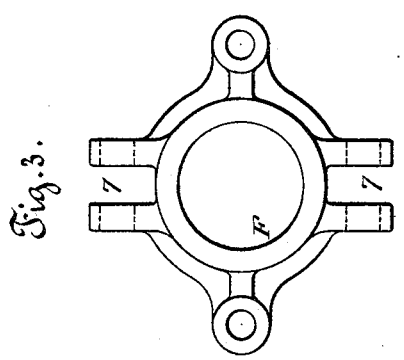
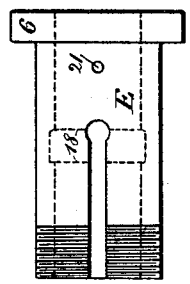
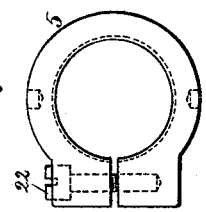
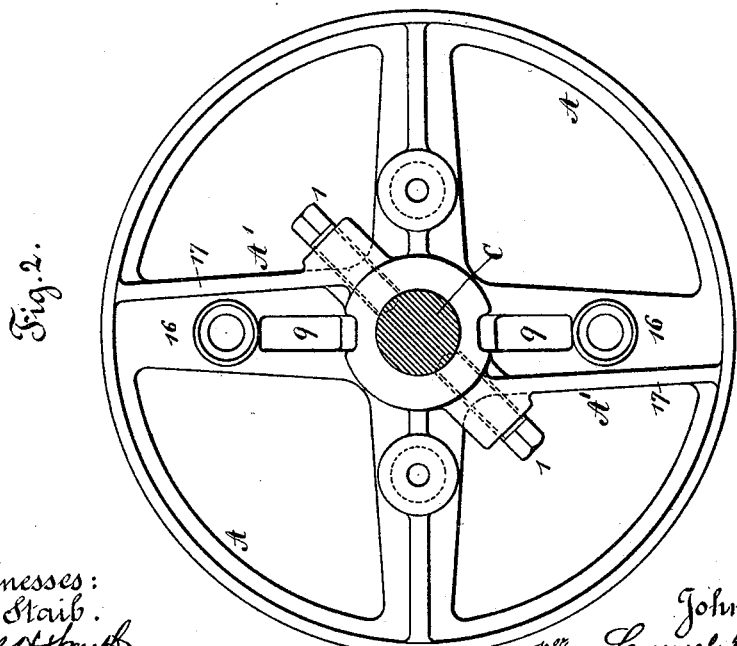
Witnesses:
John Staib.
Chas H. Smith
Inventor:
John L. Bogert
per Lemuel W. Serrell Atty

UNITED STATES PATENT OFFICE.

JOHN L. BOGERT, OF FLUSHING, NEW YORK.

FRICTION-CLUTCH.

SPECIFICATION forming part of Letters Patent No. 370,118, dated September 20, 1887.

Application filed December 27, 1886. Serial No. 222,512. (No model.)

*To all whom it may concern:*

Be it known that I, JOHN L. BOGERT, of Flushing, in the county of Queens and State of New York, have invented an Improvement in Friction-Clutches, of which the following is a specification.

This invention is for rendering the friction-clutch more reliable than heretofore in its operation and for preventing the wear upon the loose pulley from the rapid rotation and centrifugal action driving the oil away from the bearings.

In my present improvements one portion of the friction-clutch is secured permanently upon the shaft, and the other portion, having the cylindrical surface for the belt or gear, is loose upon the shaft, and there are levers acting between the two parts to draw the one against the other and produce the necessary friction or contact for the pulley to revolve the shaft; and my improvements relate to the combinations of devices, as hereinafter set forth.

In the drawings, Figure 1 is a longitudinal section showing two frictional clutches and pulleys upon one shaft, so as to receive a straight and a cross belt for driving the shaft in either one direction or the other. Fig. 2 is an elevation of the male friction-clutch. Fig. 3 is a separate view of the pulley-drawing collar. Fig. 4 is a separate view of the pulley-bush, and Fig. 5 is a separate view of the clamping-nut for one end of the pulley-bush.

The portion A of the clutch is fastened to the shaft by screws 1, or other suitable devices, and B is the pulley or wheel that revolves loosely around the shaft C when the frictional-clutch surfaces are separated. The frictional-clutch surfaces may be of any desired shape—such, for instance, as an annular V-shaped rib and corresponding groove—but usually I prefer the exterior conical frictional surface 2 upon the outer rim of the clutch A, and the corresponding internal conical frictional surface 3 within the rim of the pulley B.

The pulley-bush E is tubular to fit upon the exterior of the shaft C, and it passes into the hub of the pulley B, and there is a feather or key to cause the rotation of the bush with the pulley, and a nut, 5, screwed upon one end of the pulley-bush E, holds the hub of the pulley upon the bush, and the nut may be split and provided with a clamping-screw, 22, which, when tightened, prevents the nut from shaking loose and unscrewing. At the other end of the pulley-bush E is a flange, 6, there being a space between the flange 6 and the hub of the pulley sufficient to receive the pulley-drawing collar F, so that the pulley-bush and its flange may revolve freely within the eye of the pulley-drawing collar when the pulley is revolving and the shaft stationary, or when said shaft is receiving a rotation in the opposite direction.

I remark that although I have shown in Fig. 1 two friction-clutches, they are alike in every respect; but the sectional lines in the two clutches are at right angles to each other, and it is only necessary at this time to describe the construction and operation of one of the friction-clutches.

The pulley-drawing collar is made with four arms. Two of these arms are constructed as jaws 7 for the pivot-pins 8 of the right-angle or clutch levers G, the long arms of which clutch-levers pass through mortises 9 in the arms of the friction-clutch A, and the short arms of these levers G are connected by jaw-links 10 to the said male friction-clutch A. It is preferable to make these jaw-links with bolt ends passing through holes in the arms of the friction-clutch A and receiving jam-nuts 11 upon their ends, and the holes for the jaw-links are to be sufficiently large and the surfaces of the jam-nuts convex, so as to allow the necessary rocking motion of the jaw-links as the clutch-levers G are moved toward or away from the shaft C. The other two arms of the pulley-drawing collar F receive into holes studs 13, which are preferably made with collars, as shown, to form bases for the helical springs 14, which surround the studs, and are received into holes or sockets in the arms of the male friction-clutch A.

It will now be understood that the springs 14 tend to separate the frictional surfaces 2 and 3 by sliding the collar F, bush E, and pulley B along on the shaft and away from the male friction-clutch A, so that the pulley B and its bush E may rotate freely upon the shaft C; but when the long ends of the clutch-levers G are spread apart by pushing the conical-ended spool H in between these long arms of the levers G the connections between the short arms of the levers and the jaw-links 10 act as pivots while the pulley-drawing collar F is moved toward the friction-clutch A, and in so doing the pulley-bush E and pulley B receive a longitudinal movement that causes the frictional surfaces 2 and 3 to press into contact sufficiently for the pulley B to drive the friction-clutch A, shaft C, and the parts that are connected therewith, and when the spool H is moved away from the levers G the springs 14 separate the frictional surfaces 2 and 3 and allow the shaft to remain stationary or to be rotated in the opposite direction.

In frictional pulleys driven by belts the belt sometimes slips off the pulley, and if there are projections which can catch in the belt the belt is sometimes wound around the shaft and broken, or else some of the parts are injured or pulled down. I guard against this difficulty by making the arms A' of the friction-clutch A in the form represented in Fig. 1—that is to say, such arms are L-shaped in section—so that the recesses that receive the jam-nuts are supported by the portions 16 of the arms and the portions 17 project beyond the jam-nuts 11 upon the jaw-links 10; hence the belt if it slips off the pulley will by the portions 17 of the arms be kept away from such jam-nuts, and also away from the outer ends of the sockets that receive the springs, and the belt is not liable to be injured.

There is a cavity at 18 within the pulley-bush, and a hole passes diagonally through the shaft at 19, so that oil can be poured into this cavity when the parts are at rest, and the centrifugal action does not throw the oil out. I also provide holes 21 through the pulley-bush, so that lubricating material will reach the interior of the pulley-drawing collar for its lubrication.

I do not herein lay claim to this improved means for lubricating loose pulleys, as the same forms the subject of a separate application.

I claim as my invention—

1. The friction-clutch A, fastened to the shaft, and the loose pulley B, each having an annular frictional surface, and a flange, 6, connected with the loose pulley B, in combination with the pulley-drawing collar F between the flange 6 and hub of the pulley, and the levers G, pivoted upon the said collar and connected to the friction-clutch A, substantially as set forth.

2. The loose pulley B, in combination with the pulley-bush E, passing through the hub and connected thereto and surrounding the shaft, and having a flange, 6, the pulley-drawing collar F around the pulley-bush and between the hub and the flange of the pulley-bush, the clutch-levers G, pivoted upon the pulley-drawing collar, the friction-clutch A, having openings through which the levers pass, and the connection between the clutch and the levers G, substantially as set forth.

3. The pulley-drawing collar and the pulley B, in combination with the friction-clutch A and the clutch-levers G, pivoted upon the pulley-drawing collar and passing through mortises in the arms of the friction-clutch A, the studs 13, and springs 14, for separating the pulley B from the friction-clutch A, substantially as set forth.

4. The friction-clutch A and loose pulley B, with adjacent frictional surfaces, in combination with the pulley-drawing collar, levers, and jaw-links, the arms of the friction-clutch A being formed with flanges adjacent to the nuts upon the jaw-links and extending beyond them to prevent the said nuts injuring the belt, substantially as set forth.

5. The loose pulley B, having within it the pulley-bush E, and means for connecting the bush and pulley so that they revolve together, in combination with the clutch A, the pulley-drawing collar F around the bush, the clutch-levers, and the shaft C, having a diagonal hole through the same, one end of which is adjacent to a recess around the inner surface of the pulley-bush, and the other end is outside of the pulley-bush for receiving lubricating material, there being a hole through the pulley-bush for lubricating the drawing collar, substantially as set forth.

Signed by me this 23d day of December, A. D. 1886.

JOHN L. BOGERT.

Witnesses:
 GEO. T. PINCKNEY,
 WILLIAM G. MOTT.